United States Patent
Guerrero

(10) Patent No.: US 7,058,905 B2
(45) Date of Patent: Jun. 6, 2006

(54) METHOD AND APPARATUS FOR CONTROLLING THE DISPLAY OF HIERARCHICAL INFORMATION

(75) Inventor: Jaime F. Guerrero, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 515 days.

(21) Appl. No.: 09/844,258

(22) Filed: Apr. 26, 2001

(65) Prior Publication Data

US 2001/0043238 A1 Nov. 22, 2001

Related U.S. Application Data

(63) Continuation of application No. 09/054,068, filed on Apr. 2, 1998, now Pat. No. 6,236,400.

(51) Int. Cl.
*G06F 3/00* (2006.01)

(52) U.S. Cl. ...................... 715/853; 715/815; 715/818; 715/841

(58) Field of Classification Search ................ 345/853, 345/841, 738, 737, 854, 856, 851; 707/104.1
See application file for complete search history.

(56) References Cited

U.S. PATENT DOCUMENTS

| | | | |
|---|---|---|---|
| 5,515,487 A * | 5/1996 | Beaudet et al. ............. 345/140 |
| 5,815,155 A * | 9/1998 | Wolfston, Jr. ............... 345/855 |
| 5,825,355 A * | 10/1998 | Palmer et al. .............. 345/705 |
| 6,738,787 B1 * | 5/2004 | Stead ...................... 707/104.1 |

OTHER PUBLICATIONS

Microsoft Screen Dump, 1983-1999.*

* cited by examiner

*Primary Examiner*—Ba Huynh
*Assistant Examiner*—Mylinh Tran
(74) *Attorney, Agent, or Firm*—Martine Penilla & Gencarella, LLP

(57) ABSTRACT

Embodiments of the invention display hierarchical information efficiently. Hierarchical information is displayed in a vertical browser comprising a path list and a choices list. A choices list displays selection choices at a given hierarchical level. When a selection is made in the choices list, the selection is displayed in the path list. The choices list is updated to reflect the next hierarchical level. The path list displays a plurality of choices that represent the traversal path through the hierarchical information. Backwards traversal is possible by selecting an entry in the path list. The path list is updated to remove the selected entry and any successive entry. The hierarchical level that contains the path list entry is displayed in the choices list. The path and choices list can be independently sized and are automatically maintained to remove irrelevant information.

10 Claims, 9 Drawing Sheets ns made. # METHOD AND APPARATUS FOR CONTROLLING THE DISPLAY OF HIERARCHICAL INFORMATION This is a continuation application of Ser. No. 09/054,068 filed Apr. 2, 1998, now U.S. Pat. No. 6,236,400, issued on May 21, 2001.

BACKGROUND OF THE INVENTION

1. Field of the Invention

This invention relates to computer software, and more specifically to user interface components of a computer system displaying hierarchical information.

2. Background Art

Computer operating systems store information in files on a storage medium that is accessible via a file system. A file system organizes the contents of a storage device such that a user can determine the contents of the storage device. To organize files, a file hierarchy is adopted by some operating systems' file systems. Existing operating systems are inefficient in the manner in which the file hierarchy is displayed for review. For example, existing operating systems continue to display information that is no longer relevant to the user.

Microsoft DOS, Windows and the Macintosh OS are examples of operating systems whose file systems organize files in a hierarchy into directories. The file hierarchy begins with a root directory. Directories can contain files or other directories.

The hierarchical approach in a file system allows a user to categorize or group files. FIG. 1 provides an example of a hierarchical file structure n102 that groups files into directories. Root 104 includes documents directory 106, applications directory 107, system directory 108 and root-level files 105. Applications directory 107 and system directory 108 contain application directories and files 109 and system directories and files 110, respectively. Documents directory 106 is a child directory (or subdirectory) of root directory 104 and includes word processing directory 111, spreadsheet directory 112 and graphics directory 113. Word processing directory 111, spreadsheet directory 112 and graphics directory 113 that contain word processing documents 114, spreadsheet documents 115 and graphics documents 116 (respectively).

A user can direct the operating system to traverse through hierarchical' file structure 102 to locate a file or directory in the file system. The route to directories or files in hierarchical file structure 102 is referred to as a path. For example, a path exists between root directory 104 and graphics documents 116 through documents directory 106 and graphics directory 113.

An operating system provides a mechanism for displaying the file hierarchy. One example of such a display mechanism is the Windows tree display illustrated in FIG. 2.

Display 202 includes a folder display section 204 and a contents display section 206. Folder display section 204 depicts the hierarchical structure that includes a storage medium, entry 212 designated by the drive icon and the letter "C:". Entry 212 represents the root directory for the storage medium. There are multiple child directories of the root directory (e.g., entries 214, 220 and 222) each of which can be the parent of one or more hierarchical elements (e.g., a directory). For example, entry 214 is a directory that contains other directories represented in entries 224. The hierarchical structure contained within a parent entry can be displayed by "opening" the parent entry. Entries 224 are displayed when entry 214 is opened, for example. An entry that contains subentries (e.g., a subdirectory) includes a box icon that either contains a "−" if the parent entry is open or a "+" character if the parent entry is closed.

Contents display section 206 displays the contents of the selected entry in folder display section 204. When the user selects an entry in folder display section 204, the entry is opened and the contents of the entry are displayed in contents display area 206. For example, when entry 218 (i.e., the "Resource" directory) is opened, the contents of the directory (i.e., contents 228) are displayed in contents display area 206.

The Windows tree wastes display area by displaying expanded details that the user no longer needs or is interested in. For example, to select entry 218, the user opens entries 210, 212, 214, and 216 which represent the directories along the path between the root directory and entry 218. When they are opened, their contents are displayed in folder display area 204 including those other entries that are no longer or were never relevant to the user. There is no need to use space in folder display section 204 to display these entries.

As more branches of the Windows tree are opened (or expanded), the tree expands. To manage the size of the tree, the user must periodically go through the tree and re-select an expanded entry to close the entry. An entry is selected by selecting one of the icons associated with the entry. For example, to close entry 216, the user must select either the folder icon or the icon containing a "−" symbol. These icons are small and difficult to select.

Space is also wasted in contents display area 206. As can be seen in FIG. 2, contents display area 206 must be the same size as the folders display area 204. There is no mechanism for vertically sizing folders display area 204 independent of contents display area 206. It is not uncommon for the information displayed in contents display area 206 (e.g., contents 224) to use less space than the information displayed in folder display area 204. Thus, it is not uncommon for there to be wasted vertical space in contents display area 206.

Another example of a hierarchical display mechanism used in the NeXTStep's windowing environment is referred to herein as a multicolumn browser. FIG. 3 provides an example of a multicolumn browser used in the NeXTStep windowing environment.

File viewer 302 includes browser 310 that includes columns 304–307. to display levels in the file system hierarchy. The user selects a column entry that represents an element (e.g., a directory or folder) in the file system hierarchy. If the element is a directory, the contents of the selected folder or directory is displayed in the next column. For the sake of the example, the same file system hierarchy used in FIG. 2 is used here. To illustrate, column 304 represents the hierarchical level below entry 214 of FIG. 2 (i.e., entries 224 and 216).

When entry 314 is selected, its contents are displayed in column 305. That is, column 305 displays the hierarchical level below entry 216 of FIG. 2. When the user selects entry 316 (that corresponds to entry 216 of FIG. 2), its contents are displayed in column 306. The "Resource" directory contains only files (i.e., there are no directories within the Resource directory). Thus, column 307 does not contain any entries.

Like the Windows tree structure, the multicolumn browser uses display space inefficiently. Levels of the file system hierarchy are displayed even after the user has navigated through them. For example, columns 304–305 are displayed even though the user has navigated through these levels to reach the entries in column 306. Further, the columns are all one size regardless of the display area actually needed to display a level's contents.

File viewer 302 includes icon path display area 318 that displays an icon that represents the directory shown in the column displayed under the icon. For example, icon 320 represents the "Pipeplus" directory whose contents are displayed in column 304. Similarly, icons 322 and 324 represent the "Pmail" and "Resource" directories shown in columns 305 and 306, respectively.

When a file is selected in browser 310, file viewer 302 displays an icon (e.g., icon 326) in icon path display area 318 above a blank column (e.g., column 307). While this technique can be used to identify that entry 318 is a file, it also wastes the space used to display column 307.

File viewer 302 consumes a large portion of the total display area available on a computer system's display. An alternative to the multicolumn display shown in file viewer 302 is referred to as an open panel and is limited to two columns and eliminates icon path display area 318. The open panel limits the display of the hierarchical information to only the current level and its immediate predecessor. Without icon path display area 318, there is no convenient mechanism for displaying the user's prior navigational selections, or path.

Thus, both the Windows tree structure and the NeXTStep browser use display area space inefficiently by, for example, displaying irrelevant information. Both techniques also waste space by requiring that display sections (e.g., the vertical display space containing folder display section 204 and contents display section 206 of FIG. 2 and columns 304–307 of FIG. 3) be the same size. Further, the last column of file viewer 302 is wasted when the previous column contains only files.

SUMMARY OF THE INVENTION

Embodiments of the invention provide a method and apparatus for controlling the display of hierarchical information. Hierarchical information is displayed efficiently such that information that is no longer needed is not displayed. There is no requirement that hierarchical levels through which the user has previously navigated be displayed. There is no need for the user to perform maintenance on the display to close expanded levels. Embodiments of the invention minimize the amount of display space that is wasted by prior art techniques.

In one embodiment of the invention a vertical browser is comprised of a path list and a choices list. The path list displays the navigation path already traversed through the hierarchy by the user. The choices list displays choices, at the hierarchical level specified by the path list, from which the user makes selections (e.g., navigational selections). The navigation path that is selected is viewable in the path list portion of the vertical browser. The user can use a selection device such as a mouse or the keyboard to select an entry. When using a mouse, an entry can be selected by clicking anywhere on the entry. As the user progresses through the navigational levels, the choices list is updated to display only those selections available at the hierarchical level specified by the path list. There is no need for the user to perform maintenance on the path list and/or choices list to, for example, remove irrelevant information.

In one embodiment of the invention, the path list initially displays the root directory of the file system hierarchy and the choices list displays the contents of the root directory. When the user selects an entry in the choices list, the selected entry is added to the bottom of the path list. If the selected entry is a directory, the entries in the choices list are replaced by the selected entries files and subdirectories. If the selection is a file, the choices list is removed and only the path list is displayed in the vertical browser. In an alternative embodiment, the choices list portion of the vertical browser is blank when the bottom-most entry in the path list is a file.

In the choices list, a position indicator, or marquee (e.g., a dotted line marquee), is used to indicate the current position of the "cursor." The right arrow key can be used to add the choices list entry with the marquee to the path list. The up and down arrows can be used to move the marquee among the choices list entries. The left arrow can be used to remove the last path list entry. A removed entry is marqueed in the resulting choices list. The marquee can also be repositioned by typing a search criteria that comprises one or more characters of an entry in the choices list. The marquee is positioned on the first entry in the choices list that begins with the search criteria typed by the user. The search criteria can be reset to reposition the marquee over another entry by, for example, first pressing an arrow key or clicking a mouse button before entering the new prefix.

In one or more embodiments of the invention, the user can return to a previous navigational point by selecting an entry in the path list. When a path list entry is selected, the path list entries below the selected entry in the path list are removed. The choices list is reset to the choices available at that navigational point.

DETAILED DESCRIPTION OF THE INVENTION

A method and apparatus for controlling the display of hierarchical information is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiment of Computer Execution Environment (Hardware)

Figure 1:
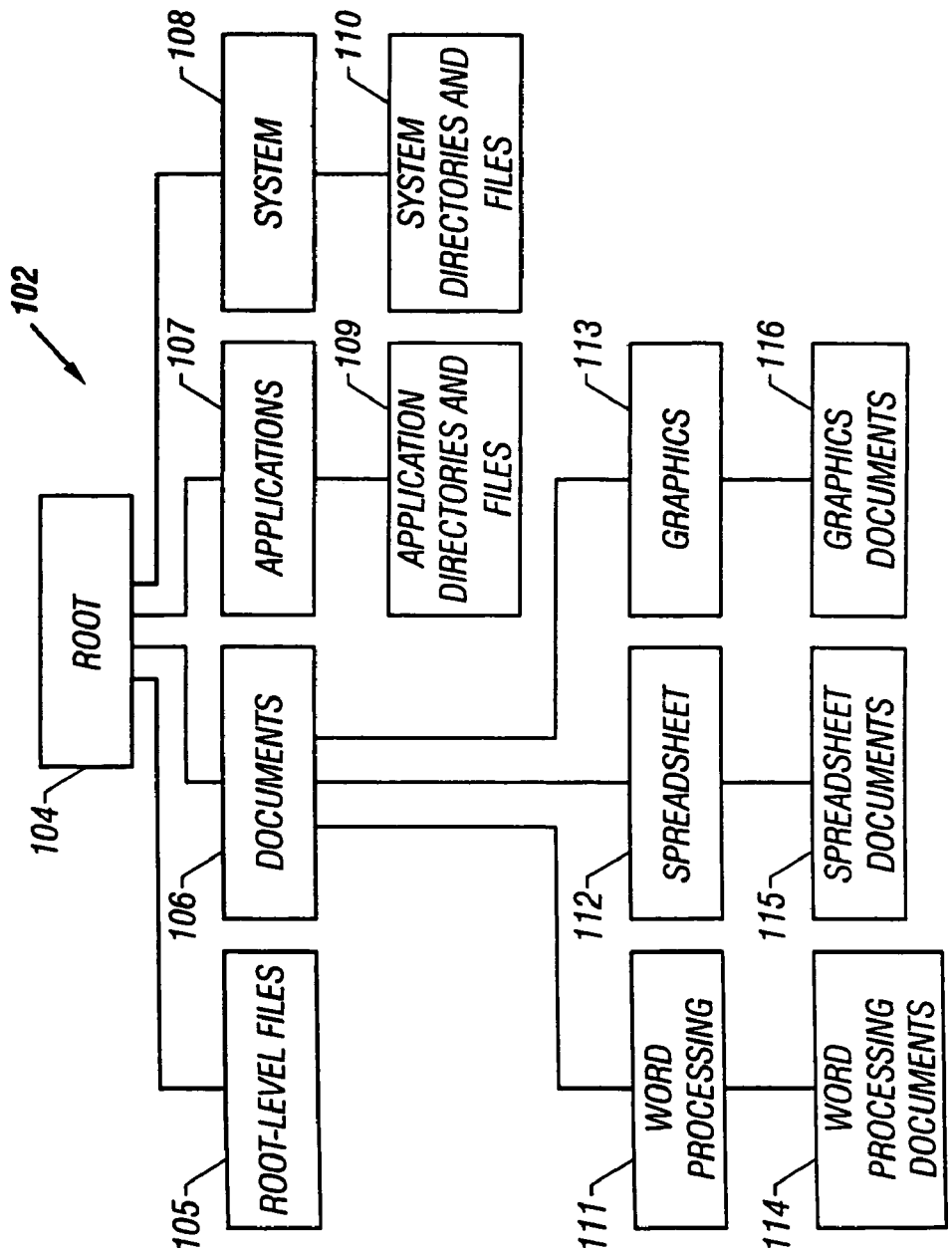
FIG. 1 provides an example of a hierarchical file structure that groups files into directories.
Figure 2:
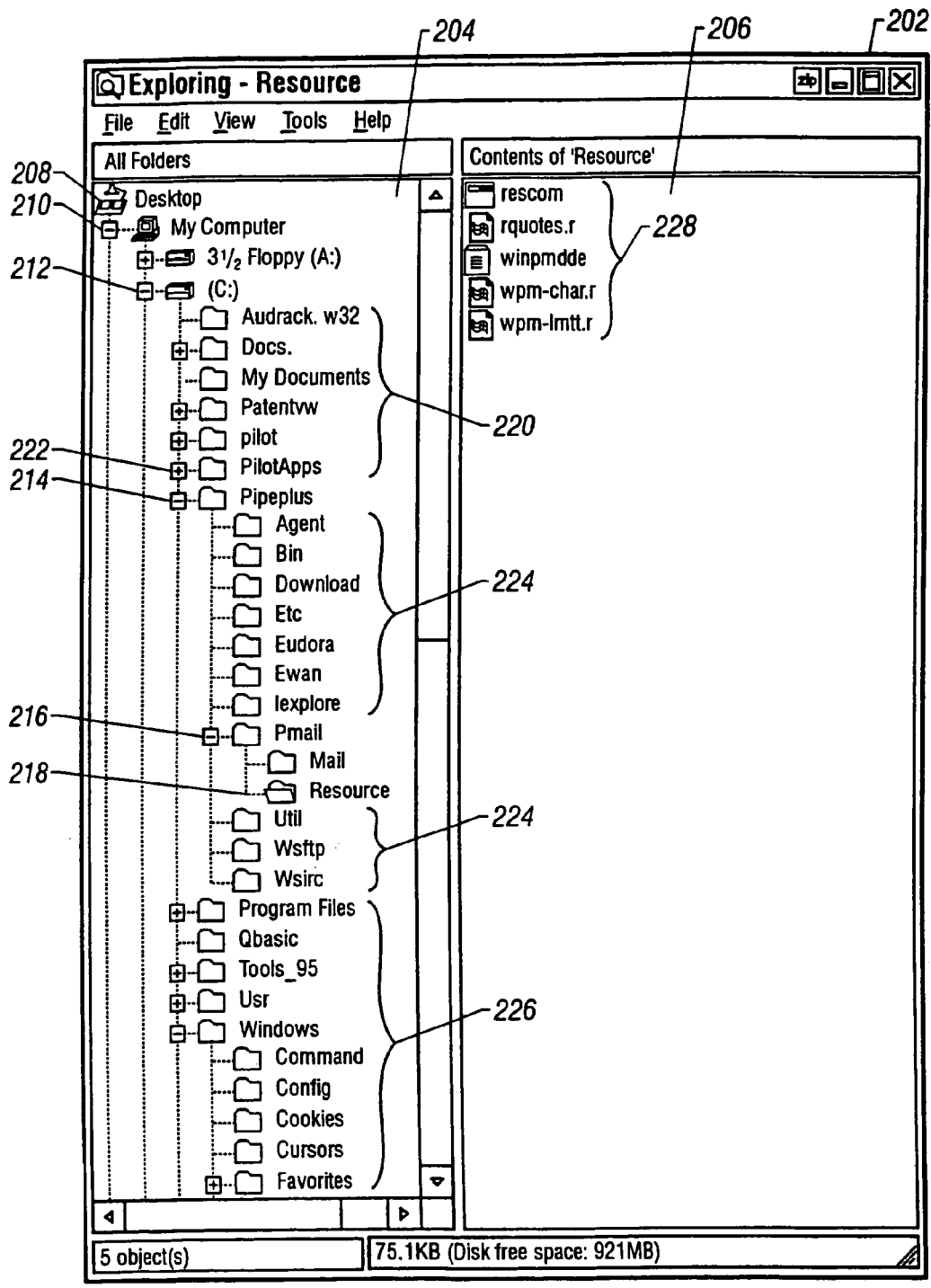
FIG. 2 provides an example of the Windows tree display.
Figure 3:
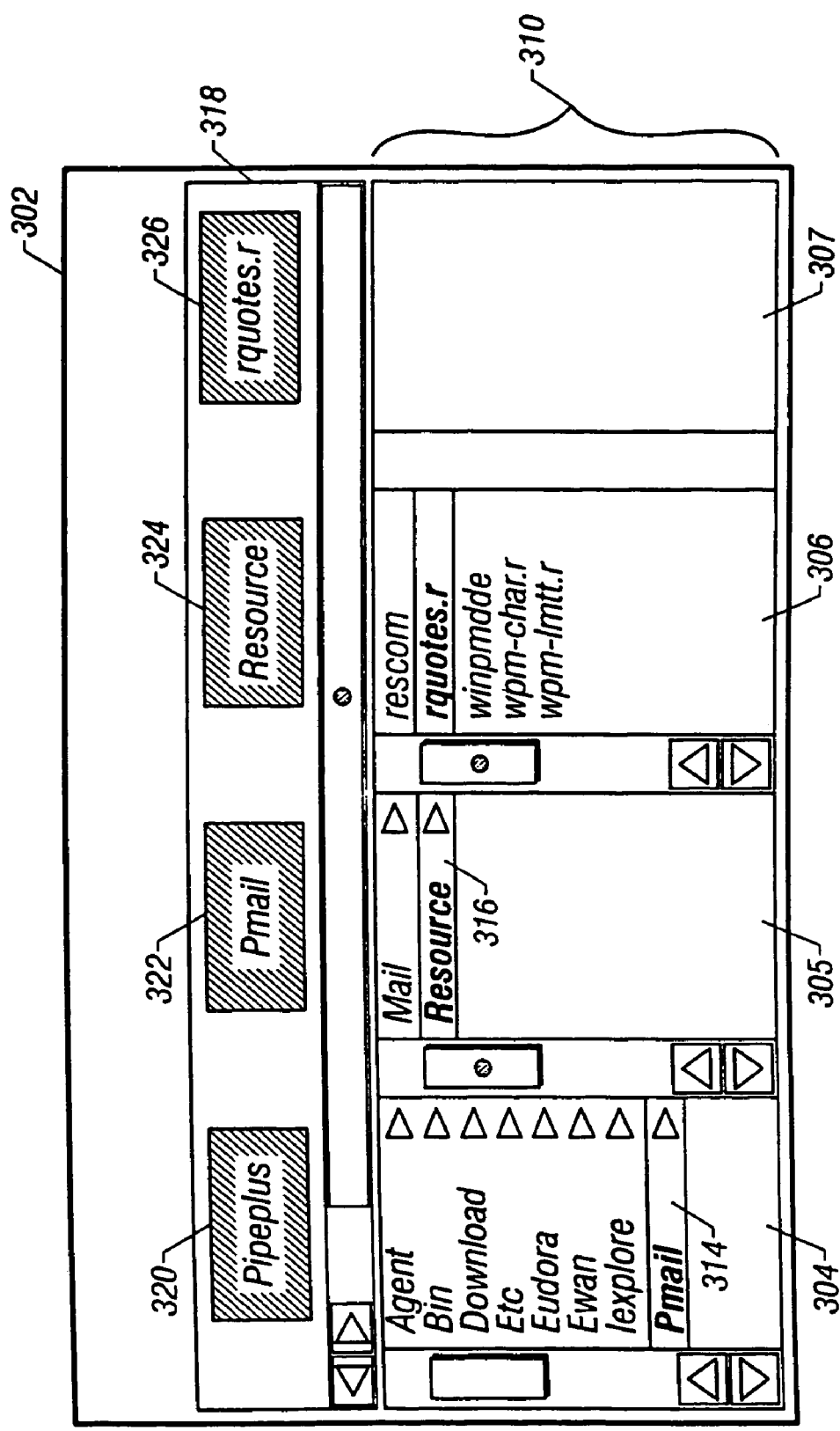
FIG. 3 provides an example of a multicolumn browser used in the NeXTStep windowing environment.
Figure 4:
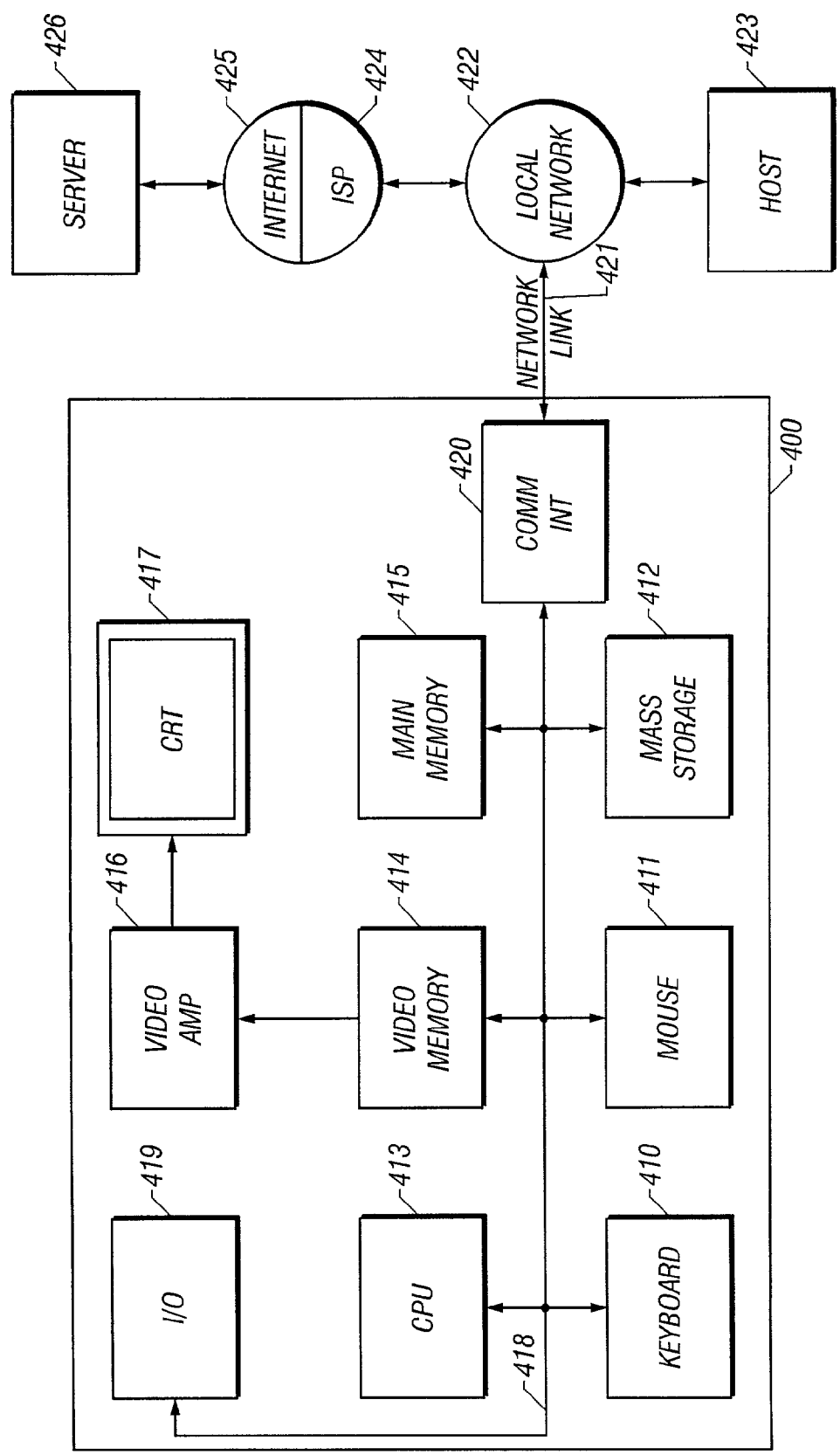
FIG. 4 is a block diagram of an embodiment of a computer system capable of providing a suitable execution environment for an embodiment of the invention.

An embodiment of the invention can be implemented as computer software in the form of computer readable program code executed on a general purpose computer such as computer 400 illustrated in FIG. 4. A keyboard 410 and mouse 411 are coupled to a bi-directional system bus 418. The keyboard and mouse are for introducing user input to the computer system and communicating that user input to processor 413. Other suitable input devices may be used in addition to, or in place of, the mouse 411 and keyboard 410. I/O (input/output) unit 419 coupled to bi-directional system bus 418 represents such I/O elements as a printer, A/V (audio/video) I/O, etc.

Computer 400 includes a video memory 414, main memory 415 and mass storage 412, all coupled to bi-directional system bus 418 along with keyboard 410, mouse 411 and processor 413. The mass storage 412 may include both fixed and removable media, such as magnetic, optical or magnetic optical storage systems or any other available mass storage technology. Bus 418 may contain, for example, thirty-two address lines for addressing video memory 414 or main memory 415. The system bus 418 also includes, for example, a 32-bit data bus for transferring data between and among the components, such as processor 413, main memory 415, video memory 414 and mass storage 412. Alternatively, multiplex data/address lines may be used instead of separate data and address lines.

In one embodiment of the invention, the processor 413 is a microprocessor manufactured by Motorola, such as the 680×0 processor or a microprocessor manufactured by Intel, such as the 80×86, or Pentium processor, or a SPARC™ microprocessor from Sun Microsystems™. However, any other suitable microprocessor or microcontroller may be utilized. Main memory 415 is comprised of dynamic random access memory (DRAM). Video memory 414 is a dual-ported video random access memory. One port of the video memory 414 is coupled to video amplifier 416. The video amplifier 416 is used to drive the cathode ray tube (CRT) raster monitor 417. Video amplifier 416 is well known in the art and may be implemented by any suitable apparatus. This circuitry converts pixel data stored in video memory 414 to a raster signal suitable for use by monitor 417. Monitor 417 is a type of monitor suitable for displaying graphic images.

Computer 400 may also include a communication interface 420 coupled to bus 418. Communication interface 420 provides a two-way data communication coupling via a network link 421 to a local network 422. For example, if communication interface 420 is an integrated services digital network (ISDN) card or a modem, communication interface 420 provides a data communication connection to the corresponding type of telephone line, which comprises part of network link 421. If communication interface 420 is a local area network (LAN) card, communication interface 420 provides a data communication connection via network link 421 to a compatible LAN. Wireless links are also possible. In any such implementation, communication interface 420 sends and receives electrical, electromagnetic or optical signals which carry digital data streams representing various types of information.

Network link 421 typically provides data communication through one or more networks to other data devices. For example, network link 421 may provide a connection through local network 422 to host computer 423 or to data equipment operated by an Internet Service Provider (ISP) 424. ISP 424 in turn provides data communication services through the world wide packet data communication network now commonly referred to as the "Internet" 425. Local network 422 and Internet 425 both use electrical, electromagnetic or optical signals which carry digital data streams. The signals through the various networks and the signals on network link 421 and through communication interface 420, which carry the digital data to and from computer 400, are exemplary forms of carrier waves transporting the information.

Computer 400 can send messages and receive data, including program code, through the network(s), network link 421, and communication interface 420. In the Internet example, server 426 might transmit a requested code for an application program through Internet 425, ISP 424, local network 422 and communication interface 420. In accord with the invention, one such downloaded application is the method and apparatus for controlling the display of hierarchical information described herein.

The received code may be executed by processor 413 as it is received, and/or stored in mass storage 412, or other non-volatile storage for later execution. In this manner, computer 400 may obtain application code by way of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer system described above is for purposes of example only. An embodiment of the invention may be implemented in any type of computer system or programming or processing environment including, but not limited to, an embedded system.

Vertical Browser

Embodiments of the invention provide a method and apparatus for controlling the display of hierarchical information. Hierarchical information is displayed efficiently. The user is not required to perform maintenance to remove information that is no longer relevant. There is no requirement that hierarchical levels through which the user has previously navigated be displayed. There is no need for the user the perform maintenance on the display to close expanded levels. Information is displayed in vertical display areas that can be sized independently.

In one embodiment of the invention, a vertical browser is used to display hierarchical information. The vertical browser is described herein with reference to displaying hierarchical file system information. However, it should be apparent to one of ordinary skill that the vertical browser described with reference to one or more embodiments of the invention can be used to display any type of hierarchical information.

Figure 5:
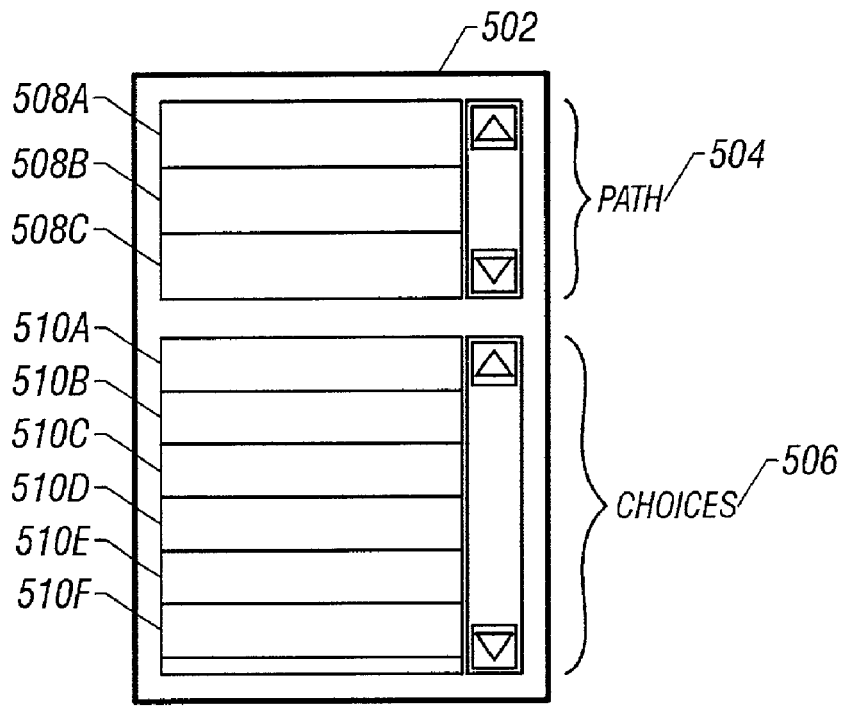
FIG. 5 provides an example of a vertical browser according to an embodiment of the invention.

FIG. 5 provides an example of a vertical browser according to an embodiment of the invention. In one or more embodiments of the invention, vertical browser 502 displays hierarchical information, or information organized hierarchically.

Generally, a hierarchy contains levels and branches between the levels in the hierarchy. The point at which a level branches to another level is referred to as a node. A node can have zero or more nodes branching from it in the hierarchy. A node that has zero nodes branching from it is referred to as a leaf node. A node that branches from another node is referred to as a child node. A node that has child nodes is a parent node. Examples of descendent nodes of a parent node include child nodes, granchild nodes, great-grandchild nodes, etc. A node that has no parent node is referred to as a root node. Directories and files are examples of nodes of a file hierarchy.

As the user traverses through the hierarchy, the traversal path is displayed in vertical browser 502. Vertical browser 502 includes path list 504 and choices list 506. Path list 504 displays the navigation path selected by the user. For example, path list 504 comprises a set of nodes in the hierarchy each of which represents a selection at a level in the hierarchy. Entries in choices list 506 (e.g., entries 510A–510F) display the available selections to the user at a given level in the hierarchy. A scroll bar can be associated with path list 504 and choices list 506 to scroll through entries, if needed. Entries 508A–508C of path list 504 identify the selections made from the choices displayed in entries 510A–510F. of choices list 506, for example.

In one embodiment of the invention, path list 504 initially displays the root level of the file system hierarchy and choices list 506 displays the root level's children. As a choice is selected from choices list 506, it is added to path list 504 and the children of the choice are displayed in choices list 506. FIGS. 6A–6D provide examples of a vertical browser according to an embodiment of the invention.

Figure 6A:
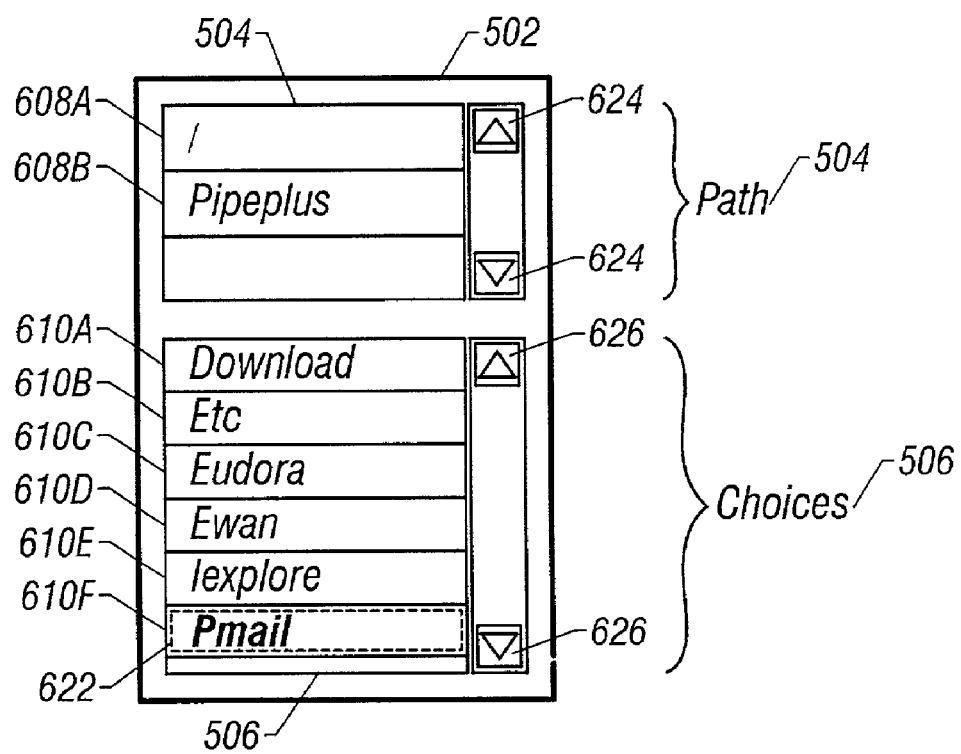
FIGS. 6A–6E provide examples of a vertical browser according to an embodiment of the invention.

Referring to FIG. 6A, vertical browser 502 includes entry 608A that corresponds to the root of the hierarchy (e.g., the root directory of a file system). Entry 608B of path list 504 identifies a hierarchical level below (i.e., a child of) the root level. The children of the last entry in path list 504 (e.g., entry 608B) are displayed in choices list 506 (e.g., entries 610A–610F). For example, entries 610A–610F are children of the hierarchical level identified in entry 608B.

Scrollbars are associated with path list 504 and choices list 506 in this embodiment. The scrollbar associated with path list 504 is inactive since there is no need to scroll path list 504. The arrow icons 624 can be grayed to indicate that the scrollbar is inactive. The scrollbar associated with choices list 506 is active (n.b., arrow icons 626 are black to indicate that they are active) and can be used to scroll through the remaining choices at the current hierarchical level.

To navigate through the hierarchy, the user selects an entry (e.g., entry 610F) in choices list 506, the selection is added to path list 504. If the selection has children, choices list 506 is updated to display the selection's children. If the selection is a leaf node, choices list 506 is removed and path list 504 is displayed in the vertical browser. In an alternative embodiment, choices list 506 can be displayed with no entries. In yet another embodiment, leaf nodes when selected remain selected (e.g., shown in reverse video) in choices list 506 and are not added to path list 504.

The user can use a mouse, or other pointing device, or the keyboard, for example, to select an entry. When using a mouse, an entry can be selected by clicking and releasing the pointing device's main "select" button anywhere on the entry. For example, to select entry 510D in choices list 506, the user can position the pointing device's "cursor" (e.g., mouse pointer's arrow icon) anywhere within entry 510D.

The keyboard can also be used for input. The up and down arrow keys can be used to move a keyboard "cursor" through the entries in choices list In choices list 506, a marquee (e.g., a dotted line marquee) is used to indicate the current position of the keyboard cursor.

The marquee can also be repositioned to an entry in choices list 506 by typing a search criteria comprised of one or more characters of the entry. The marquee is positioned on the first entry in choices list 506 that begins with the search criteria. The search criteria can be reset to reposition the marquee over another entry by pressing an arrow key or clicking a mouse button. The entry of choices list 506 that contains the marquee is selected and added to path list 504, if the right arrow key is pressed.

Keyboard input can also be used to traverse upwards in the hierarchy. The left arrow removes the last entry in path list 504 and traverses up the hierarchy to the removed entry's parent. Choices list 506 contains the children of the parent that includes the removed entry of path list 504 which is marqueed in choices list 506.

Further, in one or more embodiments of the invention, the user can return to any level of the hierarchy by selecting an entry in path list 504 with the pointer device's cursor. When an entry in path list 504 is selected, the entries positioned below the selected entry in path list 504 are removed. Choices list 506 is reset to the choices available at that navigational point.

Figure 6B:
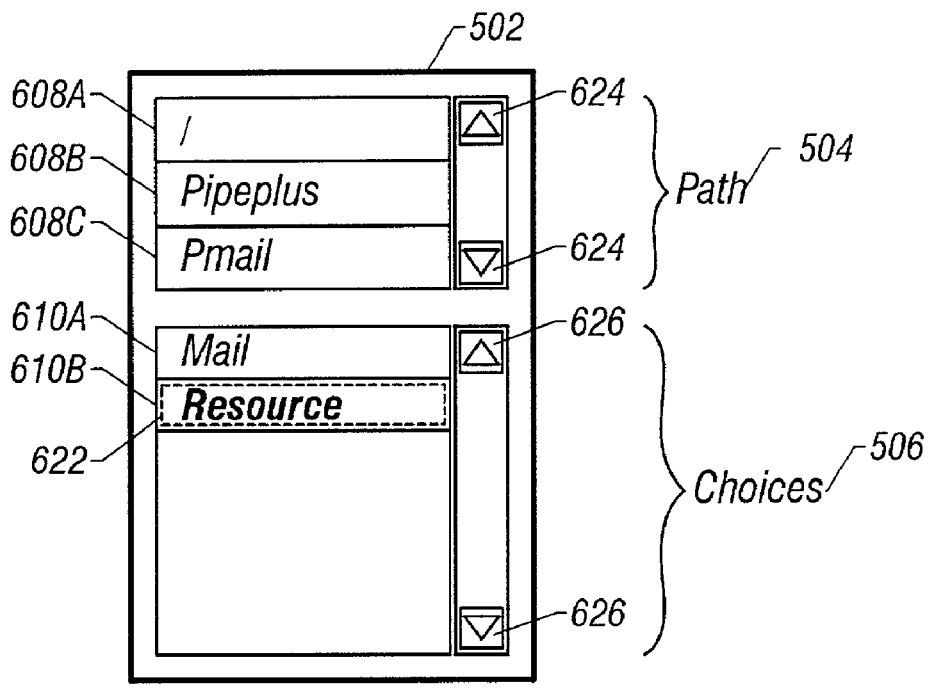

Referring to FIG. 6A, marquee 622 is located in entry 610F of choices list 506. Entry 610F can be selected using the mouse or pressing the right arrow key. FIG. 6B illustrates the state of vertical browser 502 when entry 610F of FIG. 6A is selected. Entry 610F of FIG. 6A is added to path list 504 as entry 608C. Choices list 506 is updated to reflect the navigational choices under the "Pmail" path (i.e., entries 610A–610B). Because there is no need to scroll path list 504 or choices list 506, arrows 624 and 626 are grayed.

Figure 6C:
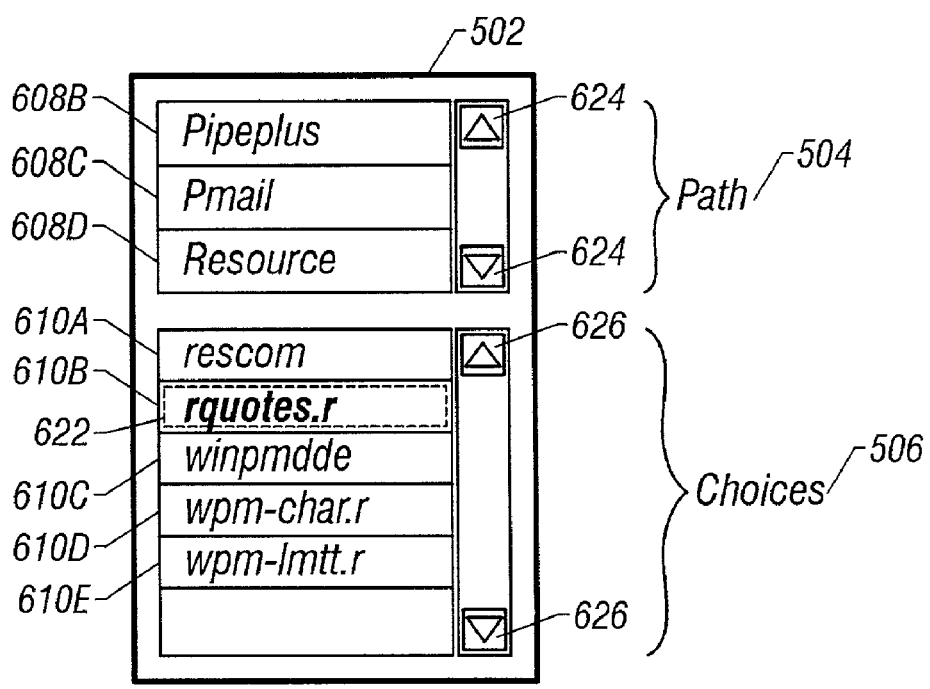

FIG. 6C reflects the vertical browser when entry 610B of FIG. 6B is selected. Entries 610A–610E reflect the choices under the "Resource" selection (i.e., entry 608C). Arrows 626 of choices list 506 are grayed. Path list 504 includes entries 608A (not shown) and 608B–608C.

In one embodiment of the invention, path list 504 is limited to a maximum size (e.g., one-third the size of vertical browser 502). When an entry (e.g., 608D) is added to path list 504 once it has reached its maximum size, the first entry (e.g., 608A) is scrolled up out of view, the new entry (e.g., 608D) is added to the bottom, and scrolling arrows 626 are enabled.

Figure 6D:
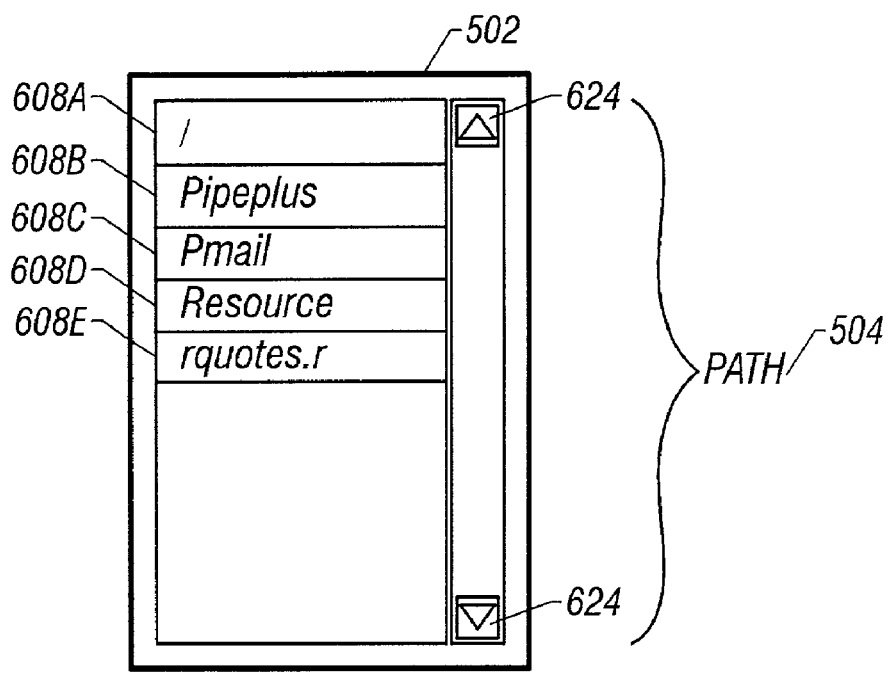
Figure 6E:
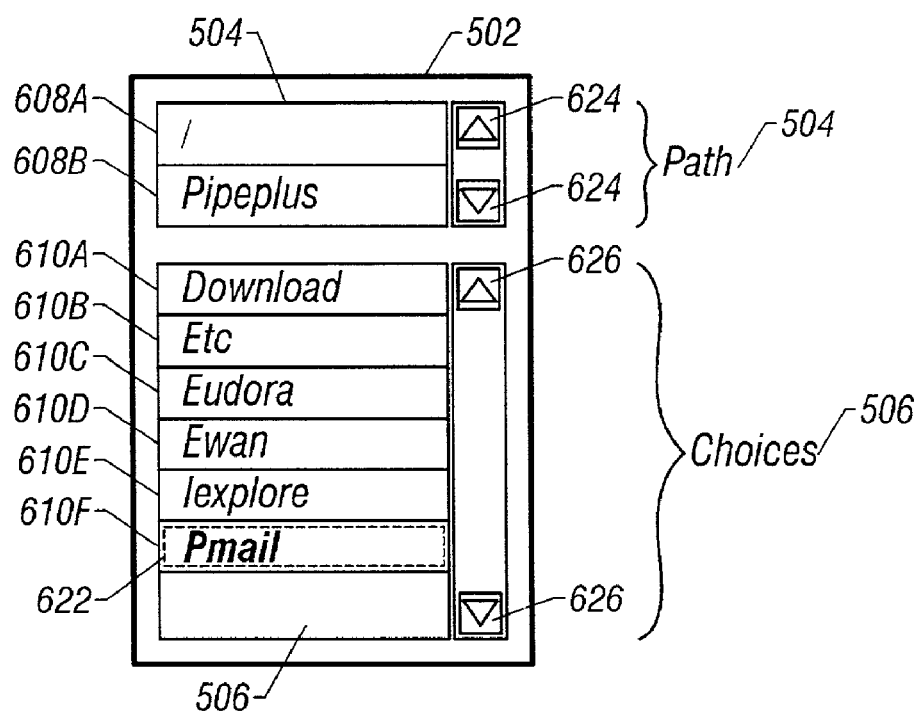

In one embodiment, path list 504 shrinks to a size that is less than the maximum size but large enough to accommodate the number of entries that it contains. This yields more space for choices list 506 which expands to fill the space surrendered by path list 504. Choices list 506 can thereby show more choices. Referring to FIG. 6A, path list 504 uses less than the amount of space allocated to it. Referring to FIG. 6E, path list 504 is shrunk and choices list 506 claims the space freed from path list 504.

Since there are no choices when leaf node of the hierarchy is selected, choices list 506 is removed from vertical browser 502 in an embodiment of the invention. Vertical browser 502 comprises path list 504 which includes the leaf node selection. For example, choices list 506 of FIG. 6C includes entry 610B which is a leaf node. FIG. 6D illustrates vertical browser 502 when entry 610B is selected. Vertical browser 502 includes path list 504 and the leaf node selection (i.e., entry 608E). If needed, arrows 624 and scrolling are activated.

By making a selection in path list 504, the user can traverse up the hierarchy to the level of the selection made in path list 504. The selection entries below the selected entry in path list 604 are removed from path list 604. Choices list 506 displays the choices available under the selected entry. For example, if a user selects entry 608B of FIG. 6D, vertical browser 502 of FIG. 6A is displayed. Entries 608C–608E of FIG. 6D are removed from path list 504 to yield path list 504 of FIG. 6A. Choices list 506 of FIG. 6A reflects the choices available under the "Pipeplus" node.

Vertical Browser Process Flow

Figure 7A:
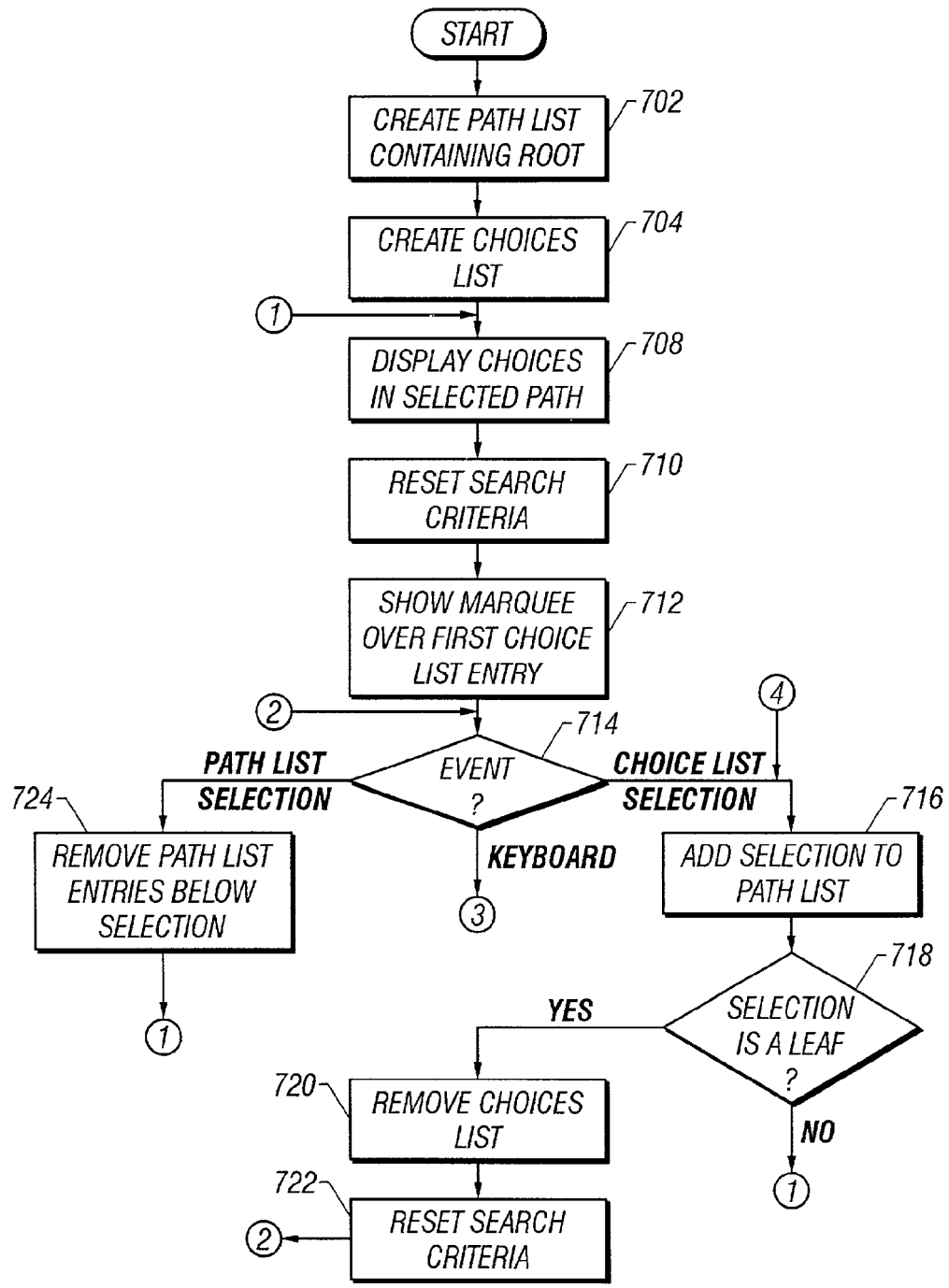
FIGS. 7A–7B provide a vertical browser process flow according to an embodiment of the invention.
Figure 7B:
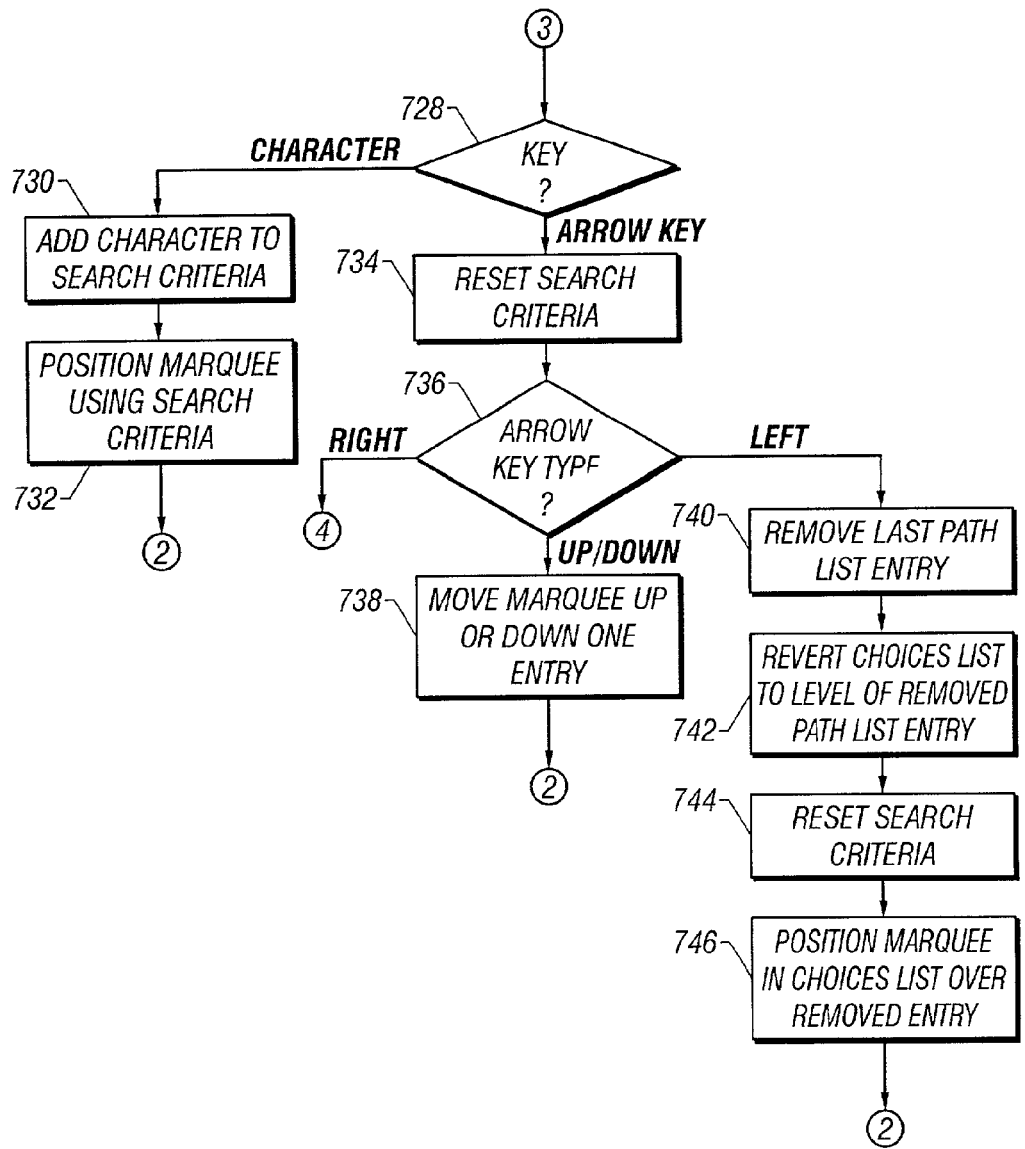

As the user navigates through a hierarchy, vertical browser 502 displays the selections in path list 504 and the choices in choices list 506. FIGS. 7A–7B provide a vertical browser process flow according to an embodiment of the invention.

At step 702, path list 504 is created. Choice list 506 is created at step 704. At step 708, the choices in the selected path (e.g., initially, the root level of the hierarchy) are represented in choices list 506. The search criteria is reset (e.g., emptied) at step 710. Marquee 622 is positioned over the first entry in choices list 506 (e.g., the first choice in the level) at step 712. At step 714, vertical browser processing awaits user input.

If it is determined (at step 714) that the user made a path list selection, processing continues at step 724. By making a selection in path list 504, the user can traverse up the hierarchy to the level of the selection made in path list 504. Thus, if the user makes a selection in path list 504, the hierarchy is traversed back to the level of the selection. The entries below the selection are removed from path list 504 at step 724. Processing continues at step 708 to update choices list 506 (i.e., display the choices at the selected path level which includes the entry selected in path list 504) and display the marquee. Processing continues at step 714 to await another input event.

If it is determined (at step 714) that a selection is made in choices list 506, processing continues at step 716 to add the selection to path list 504 in one embodiment of the invention. At step 718, a decision is made whether the selection is a leaf node of the hierarchy. In one embodiment of the invention, if the selection is a leaf node, processing continues at step 720 to remove choices list 506, reset the search criteria (at step 722) and processing continues at step 714 to await another event. If the selection is not a leaf node, processing continues at step 708 to display in choices list 506 the choices available in the selected path reset the search criteria (at step 710), and display the marquee over the first entry in choices list 506 (at step 712). Processing continues at step 714 to await another event.

If it is determined (at step 714) that the event is a keyboard event, processing continues at step 728 to process the keyboard input. At step 728, the type of key input is determined. If character input is received, processing continues at step 730 to add the character to the search criteria. At step 732, the marquee is positioned over the entry with a prefix that most closely resembles the search criteria. Processing continues at step 714 to wait for another event.

If it is determined (at step 714) that an arrow key is input by the user, processing continues at step 734 to reset the search criteria. At step 736, a determination is made as to which arrow key is input by the user. The right arrow key can be used to select the entry in choices list 506 in which the marquee is currently located. If it is determined (at step 736) that the input is the right arrow key, processing continues at step 716 to process the choices list selection. If the up or down arrow is input, processing continues at step 738 to reposition the marquee up or down in choices list 506. Processing continues at step 714 to wait for another event.

The left arrow key can be used to traverse up the hierarchy to the previous level in the hierarchy. If it is determined (at step 736) that the left arrow key is input, processing continues at step 740 to remove the last entry in path list 504. The entry's parent becomes the last entry in path list 504. At step 742, choices list 506 is updated to reflect the choices available below the parent which includes the entry removed from path list 504. The search criteria is reset at step 744. At step 746, the marquee is positioned over the entry that was removed from path list 504. Processing continues at step 714 to await another event.

Object-Oriented Programming

One or more embodiments of the invention are implemented in an object-oriented programming environment. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

An object is a generic term that is used in the object-oriented programming environment to refer to a module that contains related code and variables. A software program can be written using an object-oriented programming language whereby the program's functionality is implemented using objects.

Examples of object-oriented programming languages include C++, Objective C and the Java™ programming language. (Java and all Java-based trademarks and logos are trademarks or registered trademarks of Sun Microsystems, Inc. in the United States and other countries.) The Java programming language is an object-oriented programming language available from Sun Microsystems, Inc. In an embodiment of the invention, path list 504 and choices list 506 are implemented in the Java programming language as a "list" object class of the abstract windowing toolkit (AWT) product available from Sun Microsystems, Inc. It should be apparent that the invention can be implemented using other programming languages and/or environments.

The following methods are examples of methods of the list object class of the AWT toolkit:

| Method | Description |
| --- | --- |
| add( ) | Adds a specified item to the end of the list. |
| addActionListener( ) | Registers/Unregisters an action listener for |
| removeActionListener( ) | receiving action events of the list. |
| addItemListener( ) | Registers/Unregisters an item listener for |
| removeItemListener( ) | receiving item events of the list. |
| delItem( ) | Deletes the item at the specified position from the list. |
| deselect( ) | Deselects the item at the specified index. |
| getItem( ) | Gets the item associated with the specified position in the list. |
| getItemCount( ) | Gets the number of items in the list. |
| getMinimumSize( ) | Gets the minimum dimensions for a list with the specified number of rows. |
| getPreferredSize( ) | Gets the preferred size of the list. |
| getRows( ) | Get the number of visible lines in the list. |
| getSelectedIndex( ) | Get the position in the of the selected item in the list. |
| getSelectedItem( ) | Get the selected item in the list. |
| isIndexSelected( ) | Determines whether the specified item in the list is selected. |
| makeVisible( ) | Makes the item at the specified position in the list visible. |
| remove( ) | Removes the first occurrence of an item from the list. |
| removeAll( ) | Removes all items from the list. |
| replaceItem( ) | Replaces the item at the specified position in the list with a new string. |
| processActionEvent( ) | Process action events occurring on the list by dispatching the action event to a registered ActionListener object. |
| processEvent( ) | Process events of the list. If the event is an ItemEvent, it invokes processItemEvent. If the event is an ActionEvent, it invokes processActionEvent. |
| processItemEvent( ) | Process item events occurring on the list by dispatching them to a registered ItemListener object. |
| select( ) | Selects the item at the specified position in the list. |

Constructor methods create an instance of the list class to display a specified number of visible lines. All mouse, keyboard and focus events that occur over the displayed list are set to the list object instance. For example, when an item is selected or deselected, an item event is sent to the list. If the user double-clicks on an item, both an item event and an action event are sent to the list object instance.

Item and action listeners can be used to perform an action when an item in the list is selected or activated. A listener is registered using the addItemListener and addActionListener methods of the list object class. Once a listener is registered, it can receive events from the list. A listener can be removed using the removeItemListener and removeActionListener methods.

Thus, a method and apparatus for controlling the display of hierarchical information has been provided in conjunction with one or more specific embodiments. The invention is defined by the claims and their full scope of equivalents.

The invention claimed is:

1. In a computer system, a method of presenting information associated with a hierarchy comprising the steps of:

creating a first display area, said first display area displaying a first node of said hierarchy, the hierarchy being of a file system;

creating a second display area, said second display area presenting a plurality of child nodes of said first node;

performing the following when one of said plurality of child nodes in said second display area is selected:

updating said first display area to include said one of said plurality of child nodes; and updating said second display area to display a plurality of nodes in place of said plurality of child nodes, said plurality of nodes being the child nodes of said selected child node, and wherein said step of updating said second display area further includes the steps of:

determining whether said child node is a leaf node of said hierarchy; and removing said second display area, if said child node is a leaf node;

wherein the step of performing further includes resizing said first display area to eliminate any unused display space and allowing the second display area to expand into the space not used by the fist display space.

2. The method of claim 1 wherein said step of updating said first display area further comprises of steps of:

performing the following when said first node is selected in said first display area:

removing said one of said child nodes from said first display area; and updating said second display area to display said plurality of child nodes.

3. The method of claim 2 further comprising the step of placing the cursor over said one of said child nodes in said second display area.

4. The method of claim 1 wherein a size of said first display area is independent of a size of said second display area.

5. The method of claim 1 wherein said step of updating said second display area further comprises the step of placing a marquee over said one of said child nodes of said selected child node.

6. The method of claim 1, further comprising said step of displaying a marquee over said one of said child nodes in said second display.

7. The method of claim 6 further comprising the step of moving said marquee one entry in said second display area in response to arrow key input.

8. The method of claim 6 wherein said marquee is positioned over said one of said child nodes, said method further comprising the step of selecting said one of said child nodes in response to right arrow key input.

9. The method claim 1 further comprising the steps of:
receiving character input;
adding said character input to a search criteria;
repositioning a cursor on said one of said plurality of child nodes in response to said character input, said one of said plurality of child nodes resembling said search criteria.

10. In a computer system, a method of presenting information associated with a hierarchy comprising the steps of:
creating a first display area, said first display area displaying a first node of said hierarchy, the hierarchy being of a file system;
creating a second display area, said second display area presenting a plurality of child nodes of said first node;
performing the following when one of said plurality of child nodes in said second display area is selected:
updating said first display area to include said one of said plurality of child nodes; and
updating said second display area to display a plurality of nodes in place of said plurality of child nodes, said plurality of nodes being the child nodes of said selected child node;
wherein said step of performing further comprises the steps of:
determining whether there is unused display space in said first display area;
performing the following when there is unused display space in said first display area;
resizing said first display area to eliminate said unused display space; and
expanding said second display area to include said unused display space.

* * * * *